United States Patent
Strack et al.

(10) Patent No.: US 9,074,685 B2
(45) Date of Patent: Jul. 7, 2015

(54) EXTRUDED TUBE WELDED VESSEL LINER WITH INJECTION MOLDED END CAPS

(75) Inventors: Ludger Strack, Heidenrod (DE); Markus Lindner, Mainz (DE); Holger Guckes, Kelkheim (DE); Angela Fröhlich, Ingelheim (DE)

(73) Assignee: GM Global Technology Operations LLC, Detroit, MI (US)

(*) Notice: Subject to any disclaimer, the term of this patent is extended or adjusted under 35 U.S.C. 154(b) by 476 days.

(21) Appl. No.: 12/713,713

(22) Filed: Feb. 26, 2010

(65) Prior Publication Data

US 2011/0210127 A1  Sep. 1, 2011

(51) Int. Cl.
*F17C 1/02* (2006.01)
*F16J 12/00* (2006.01)

(52) U.S. Cl.
CPC ............ *F16J 12/00* (2013.01); *Y10T 29/49826* (2013.01); *Y02E 60/321* (2013.01)

(58) Field of Classification Search
USPC ......... 220/586, 581, 582, 587, 588, 589, 590, 220/591
See application file for complete search history.

(56) References Cited

U.S. PATENT DOCUMENTS

| | | | | |
|---|---|---|---|---|
| RE22,251 E | * | 1/1943 | Stresau | 220/587 |
| 2,365,696 A | * | 12/1944 | Grubb | 228/173.6 |
| 2,365,697 A | * | 12/1944 | Grubb | 220/586 |
| 3,372,828 A | * | 3/1968 | Pechacek et al. | 220/4.16 |
| 3,604,587 A | * | 9/1971 | Pechacek | 220/587 |
| 3,774,296 A | * | 11/1973 | Clay | 228/184 |
| 5,429,845 A | * | 7/1995 | Newhouse et al. | 428/34.1 |
| 2003/0111473 A1 | * | 6/2003 | Carter et al. | 220/586 |
| 2005/0087536 A1 | * | 4/2005 | Caudill et al. | 220/586 |
| 2008/0121643 A1 | * | 5/2008 | Blencoe et al. | 220/589 |

FOREIGN PATENT DOCUMENTS

| | | |
|---|---|---|
| DE | 195 26 154 | 1/1997 |
| EP | 1850058 | 10/2007 |
| WO | WO 99/13263 | 3/1999 |
| WO | WO 99/39896 | 8/1999 |
| WO | WO 2007/079971 | 7/2007 |
| WO | WO 2010/004831 * | 6/2009 |
| WO | 2010004813 A1 | 1/2010 |

OTHER PUBLICATIONS

WO 2010/004813 english translation.*

* cited by examiner

*Primary Examiner* — Jeffrey Allen
(74) *Attorney, Agent, or Firm* — Fraser Clemens Martin & Miller LLC; James D. Miller

(57) ABSTRACT

A pressure vessel for storing a fluid is disclosed. The pressure vessel includes a vessel liner forming a hollow tube and including a plurality of layers with an aperture formed therein, wherein at least one of the layers is a barrier layer and an end cap coupled to the vessel liner, wherein the end cap has a plurality of layers, and wherein at least one of the layers of the end cap is a barrier layer.

13 Claims, 3 Drawing Sheets

EXTRUDED TUBE WELDED VESSEL LINER WITH INJECTION MOLDED END CAPS

FIELD OF THE INVENTION

The invention relates to pressure vessels. More particularly, the invention is directed to a multi-layer vessel liner and a method for producing the vessel liner.

BACKGROUND OF THE INVENTION

A pressure vessel for storing a fluid medium (such as hydrogen) typically includes a pressure chamber which contains the pressurized fluid medium that is moved in a controlled manner in or out of the vessel. In certain designs, the pressure vessel includes an inner plastic liner with two metal mouthpieces (bosses) arranged on opposite ends, and a filament wound outer shell to support the inner vessel liner.

Typically, the vessel liner is manufactured using a conventional injection molding, blow molding, rotational molding process, or thermoforming process. For example, the following patent documents describe a vessel liner (WO 19991039896 Dulisse, JMK; WO 2007/079971 Müller, Xperion; DE 19526154 Lange, Mannesmann etc.; and WO 1999/013263 Jensen, Raufoss), each of which is incorporated herein by reference in its entirety.

To permit controlled movement of fluids in or out of the pressure chamber, the vessel is typically configured with a pressure chamber orifice and a boss is fitted in the orifice. The boss is threaded or otherwise shaped for connection to nozzles, valves, gauges, tubes, and similar fixtures which direct and control fluid flow. Accordingly, the boss is formed of a metal or another conventional material having desired properties.

The boss typically includes a cylindrical neck with a longitudinal passage that provides fluid communication between the pressure chamber and the environment outside the vessel. In certain designs, the boss includes a shoulder portion secured to one end of the neck. The shoulder portion, which is larger than the pressure chamber orifice, is secured to the liner of the pressure vessel to militate against relative movement between the boss and the liner.

In certain applications, the pressure vessel includes an end cap. Typically, the end cap is coupled to the vessel liner using a welding procedure. As such, the end cap is designed to receive and secure the boss or other utility device to the pressure vessel.

In application, it is important to provide a proper coupling surface between the end cap and the vessel liner. Additionally, it is important to provide a smooth outer surface on the vessel liner of the pressure vessel to maximize the performance of a composite winding. Further, both the vessel liner and the end cap need to meet certain permeation requirements to minimize leakage of the stored fluid from the pressure vessel. Currently, the materials used to meet permeation requirements are not suitable for providing a proper outside surface to maximize the performance of a composite winding. Likewise, the materials typically used to produce a smooth outer surface on the vessel liner may not provide suitable permeability for particular fluids stored in the pressure vessel.

It would be desirable to develop a pressure vessel and a method for producing the pressure vessel, wherein the pressure vessel and method provide a proper coupling surface between a vessel liner and an end cap, a substantially smooth outer surface of the pressure vessel, and a suitable permeability for storing various pressurized fluids.

SUMMARY OF THE INVENTION

Concordant and consistent with the present invention, a pressure vessel and a method for producing the pressure vessel, wherein the pressure vessel and method provide a proper coupling surface between a vessel liner and an end cap, a substantially smooth outer surface of the pressure vessel, and a suitable permeability for storing various pressurized fluids, has surprisingly been discovered.

In one embodiment, a pressure vessel comprises: a vessel liner forming a hollow tube and including a plurality of layers with an aperture formed therein, wherein at least one of the layers is a barrier layer; and an end cap coupled to the vessel liner, wherein the end cap has a plurality of layers, and wherein at least one of the layers of the end cap is a barrier layer.

In another embodiment a pressure vessel comprises: a vessel liner forming a hollow tube and having an aperture formed therein, wherein the vessel liner includes an outside layer, an inside layer, and a barrier layer disposed intermediate the outside layer and the inside layer; and an end cap coupled to the vessel liner, wherein the end cap has a plurality of layers, and wherein at least one of the layers of the end cap is a barrier layer.

The invention also provides methods for producing a pressure vessel.

One method comprises the steps of: forming a hollow vessel liner including a plurality of layers with an aperture formed therein, wherein at least one of the layers of the vessel liner is a barrier layer; forming an end cap having a plurality of layers, wherein at least one of the layers of the end cap is a barrier layer; and coupling the end cap to the vessel liner.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
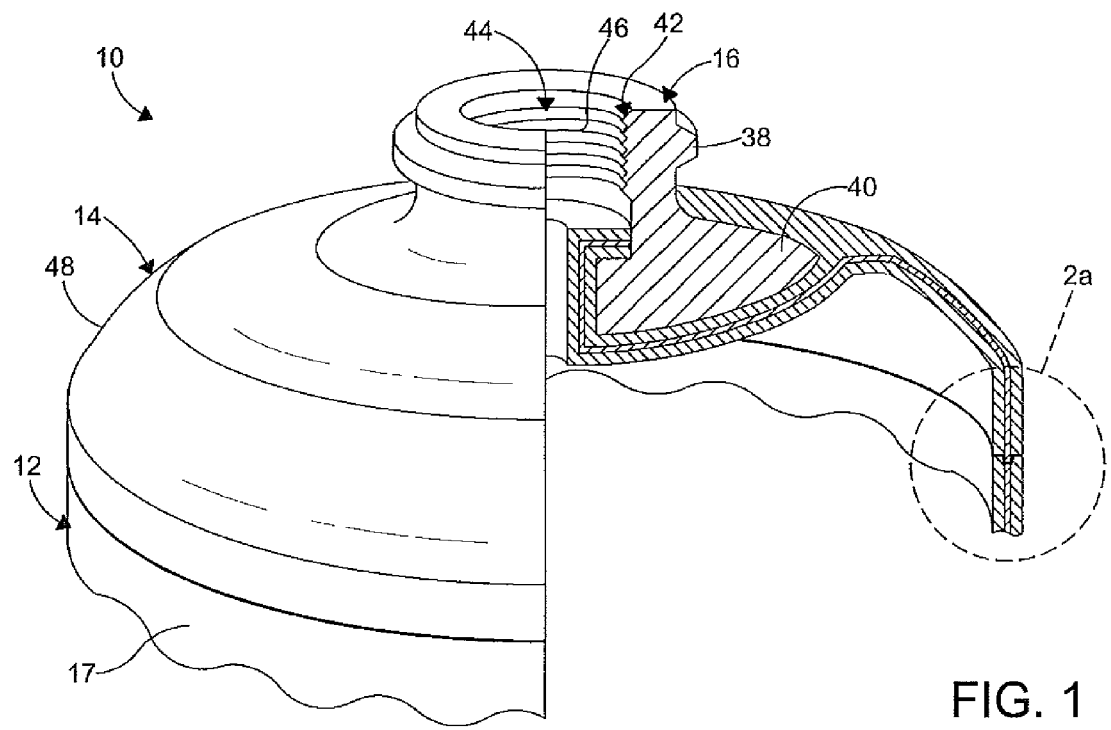
FIG. 1 is a fragmentary perspective view of the pressure vessel according to an embodiment of the present invention, a portion of the pressure vessel shown in section.
Figure 1A:
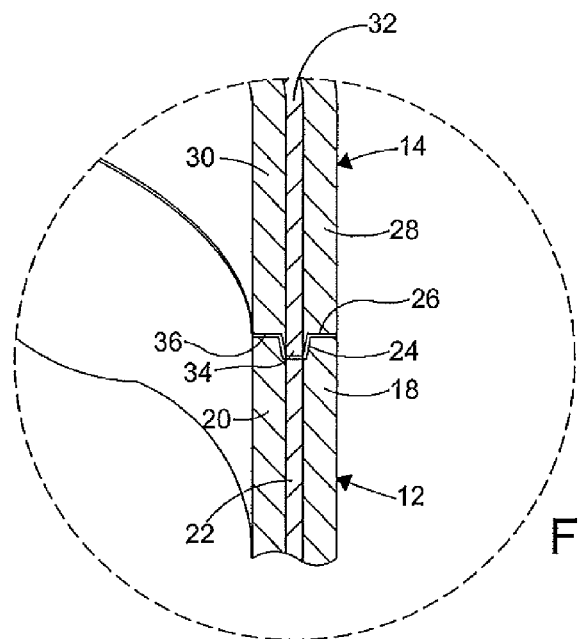
FIG. 1a is an enlarged fragmentary cross-sectional front elevational view of a portion of the pressure vessel illustrated in FIG. 1 and depicted by circle 1a therein.

FIGS. 1 and 1a illustrate a pressure vessel 10 according to an embodiment of the present invention. As shown, the pressure vessel 10 includes a vessel liner 12, an end cap 14, and a boss 16.

The vessel liner 12 is a multi-layer liner typically formed by a extrusion process. As shown, the vessel liner 12 has a substantially smooth outer surface 17 defining a substantially cylindrical shape. However, it is understood that the vessel liner 12 may have any shape, size, and contour.

As more clearly shown in FIG. 1a, the vessel liner 12 includes an outside layer 18, an inside layer 20, and a barrier layer 22 disposed between the outside layer 18 and the inside layer 20. However, any number of layers may be used. As a non-limiting example, the vessel liner 12 may include a tie layer (not shown) disposed between at least one of the outside layer 18 and the barrier layer 22 and the inside layer 20 and the barrier layer 22. Typically, each of the outside layer 18 and the inside layer 20 is formed from a thermoplastic material. However, other plastics and non-metallic materials may be used. It is understood that the outside layer 18 and the inside layer 20 may be formed from the same or similar materials. It is further understood that the outside layer 18 and the inside layer 20 may be formed from different materials or similar materials having different physical properties. The barrier layer 22 is typically formed from a metal. However, other materials having suitable permeation characteristics may be used such as copolymers for example. As a non-limiting example, the barrier layer 22 may be substantially centrally located relative to the outside layer 18 and the inside layer 20. As another example, the barrier layer may be spaced further from the outside surface 17 of the vessel liner 12 and closer to the pressure cavity defined by the vessel liner 12. However, any positioning of the barrier layer 22 may be used.

The vessel liner 12 further includes a coupling feature 24 formed on at least one surface thereof. In the embodiment shown, the coupling feature 24 is an annular channel or groove formed on at least one coupling edge 26 of the vessel liner 12. However, other coupling features may be used such as a plurality of protrusions (not shown) formed on the at least one coupling edge 26 and adapted to be received by the end cap 14, for example. As a further non-limiting example, the coupling feature 24 of the vessel liner 12 may be a structural formation to maximize a coupling area between the vessel liner 12 and the end cap 14.

The end cap 14 is a multi-layer end cap typically formed using a sandwich injection molding process known in the art. As shown more clearly shown in FIG. 1a, the end cap includes an outside layer 28, an inside layer 30, and a barrier layer 32 disposed between the outside layer 28 and the inside layer 30. However, any number of layers may be used. As a non-limiting example, the end cap 14 may include a tie layer (not shown) between at least one of the outside layer 28 and the barrier layer 32 and the inside layer 30 and the barrier layer 32. Typically, each of the outside layer 28 and the inside layer 30 is formed from a thermoplastic material. However, other plastics and non-metallic materials may be used. It is understood that the outside layer 28 and the inside layer 30 may be formed from the same or similar materials. It is further understood that the outside layer 28 and the inside layer 30 may be formed from different materials or similar materials having different physical properties. The barrier layer 32 of the end cap 14 is typically formed from EVOH. However, other copolymer materials having suitable permeation characteristics may be used.

The end cap 14 further includes a coupling feature 34 formed on at least one surface thereof. In the embodiment shown, the coupling feature 34 is an annular rib or protrusion formed on a coupling edge 36 of the end cap 14. However, other coupling features may be used such as a plurality of apertures (not shown) formed on the at least one coupling edge 36 and adapted to receive protrusions formed on the coupling edge 26 of the vessel liner 12. As a further non-limiting example, the coupling feature 34 of the end cap 14 may be a structural formation to maximize a coupling area between the vessel liner 12 and the end cap 14.

The boss 16 is typically formed from a metal. However, other materials such as plastic, rubber, and resin may be used. As shown, the boss 16 includes a neck portion 38 and a shoulder portion 40. However, it is understood that the boss 16 may have any size and shape. An inside surface 42 of the neck portion 38 defines a passage 44 between an outside environment and a pressure cavity of the pressure vessel 10. As a non-limiting example, the inside surface 42 of the neck portion 38 includes a coupling element 46 to engage and secure various fixtures and utility devices such as pressure regulators, nozzles, valves, gauges, tubes, and similar fixtures which direct and control fluid flow in and out of the pressure vessel 10. As a non-limiting example, the coupling element 46 includes a substantially helical thread or groove formed on the neck portion 38. However, other means for engaging and securing the utility devices and the boss may be used.

In use, the vessel liner 12 is formed using an extrusion process. In certain embodiments, each of the layers 18, 20, 22 of the vessel liner 12 are co-extruded in a single extrusion process to form a tube of a per-determined length. In other embodiments, the inside layer 20 is extruded into a tube formation and the barrier layer 22 is then formed around an outside surface of the inside layer 20. As a non-limiting example, the barrier layer 22 is welded to the inside layer 20 along a circumferential edge thereof. As a further example, the barrier layer 22 is formed around the inside layer 20 and welded along a longitudinal axis thereof. It is further understood that any number of weld seams may be used to secure the barrier layer 22 around the inside layer 20. The outside layer 20 is then extruded around the barrier layer 22 to form the final multi-layer vessel liner 12.

The end cap 14 is typical formed using a sandwich injection molding process. However, it is understood that the multi-layer end cap 14 may be created by at least one of a sheet extrusion and sheet calendar process and then formed into a desired shape and contour using a thermoforming process. As a further non-limiting example, the barrier layer 32 of the end cap 14 may be formed by applying a metal foil to a pre-formed outside layer 28 using at least one of a back injection molding process.

Once the vessel liner 12 and the end cap 14 are formed, at least one end cap 14 is coupled to at least one coupling edge 26 of the vessel liner 12. As a non-limiting example, a shape of each of the vessel liner 12 and the end cap 14 is pre-determined to maximize the coupling surface area therebetween. Specifically, the coupling feature 24, 34 of each of the vessel liner 12 and the end cap 14 may be formed to maximize the coupling surface area therebetween. In the embodiment shown, the coupling feature 24 of the vessel liner 12 receives the coupling feature 34 of the end cap 14 in a "tongue and groove" fashion to align the vessel liner 12 and the end cap 14 and maximize the coupling surface area therebetween. However, other shape and numbers of coupling features 24 and 34 could be used. As such, the vessel liner 12 may be coupled to the end cap 14 using a welding procedure. As a non-limiting example, the end cap 14 can be coupled to the vessel liner 12 using at least one of a hot-gas welding procedure and a hot-plate welding procedure. However, other coupling means may be used, such as an adhesive, for example. Once coupled the outer surface 17 of the vessel liner 12 is substantially smooth and continuous with an outer surface 48 of the end cap 14. As such, the outer surfaces 17, 48 provide a suitable surface for composite winding while the barrier layers 22, 32 provides a suitable permeability for storing various pressurized fluids.

Thereafter, the boss 16 is coupled to the end cap 14. As a non-limiting example, the boss 16 may be integrally formed with the end cap 14 during an end cap forming procedure and thereafter secured to the vessel liner 12 with the end cap 14. As a further example, the boss 16 may be a divided boss formed from at least two components (not shown) and the end cap 14 may be disposed between the at least two components and secured therebetween to couple the end cap 14 with the boss 16. Other means for coupling the boss 16 to the end cap 14 may be used such as adhesives and structural coupling features.

Figure 2:
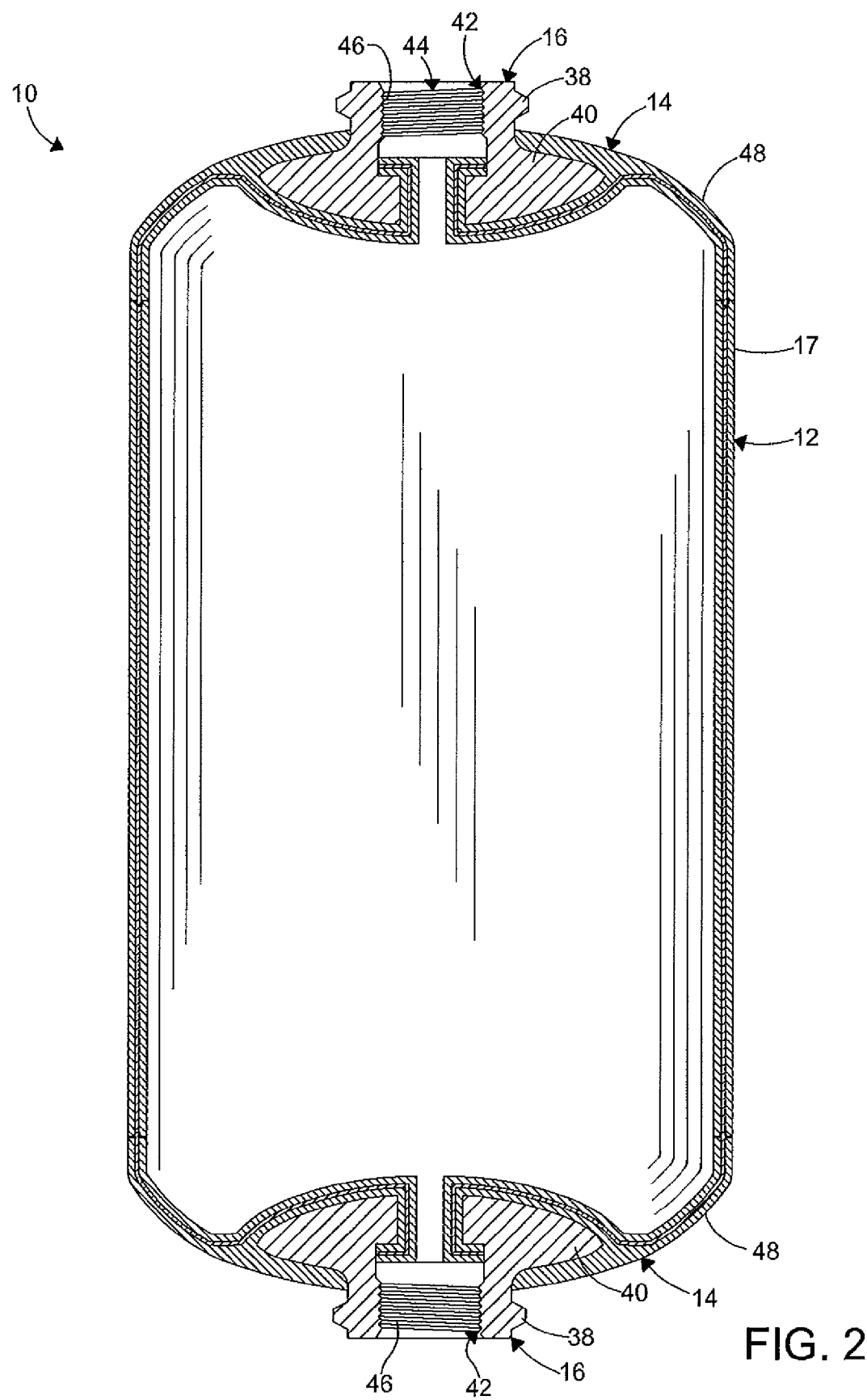
FIG. 2 is a cross-sectional side-elevational view of the pressure vessel of FIG. 1.

FIG. 2 shows the formed vessel liner 12 including a plurality of the end caps 14 and the bosses 16 secured to opposite ends thereof. In certain embodiments, the bosses 16 have similar inner diameters. However, it is understood that the bosses 16 may have any size and diameter such as a size and diameter suitable for coupling with a valve component or a thermal-pressure relief device (TPRD). It is understood that additional coatings and layers such as composites and fibers may be applied to the vessel liner 12 to form the final pressure vessel. As a non-limiting example, the additional layers formed around the vessel liner 12 may be formed by at least one of a winding process and a curing process. It is further understood that the vessel liner 12 and resultant pressure vessel may have any shape and size determined by the forming process.

Figure 3:
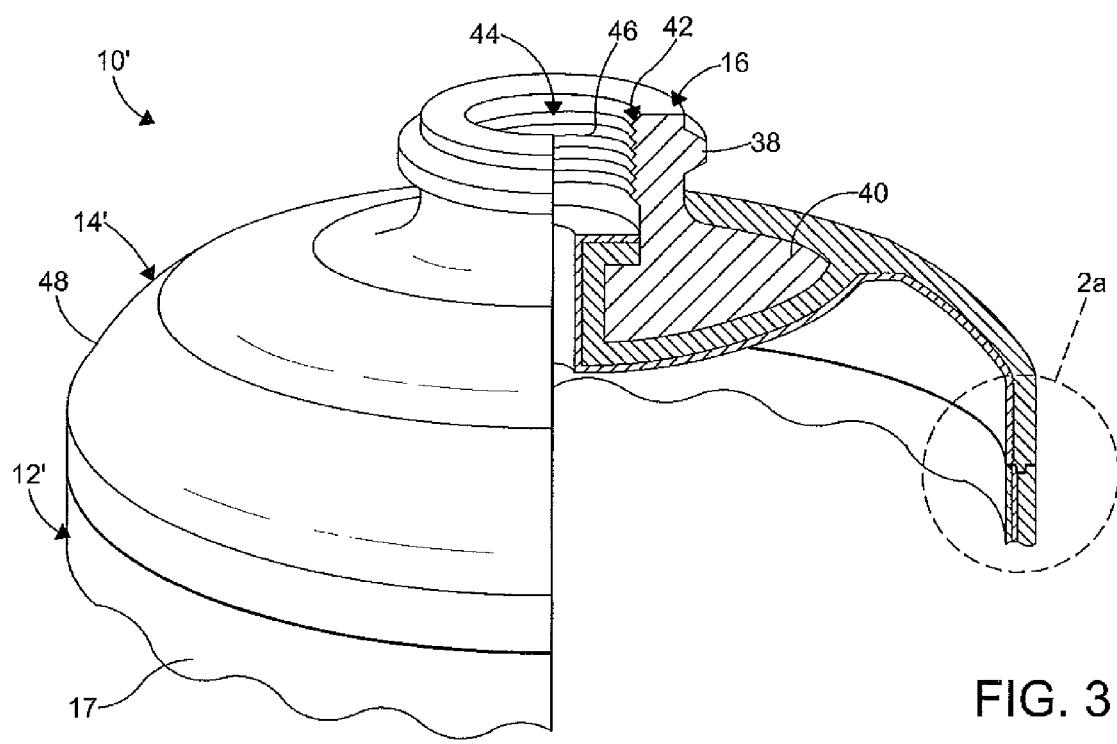
FIG. 3 is a fragmentary perspective view of a pressure vessel according to another embodiment of the present invention, a portion of the pressure vessel shown in section.
Figure 3A:
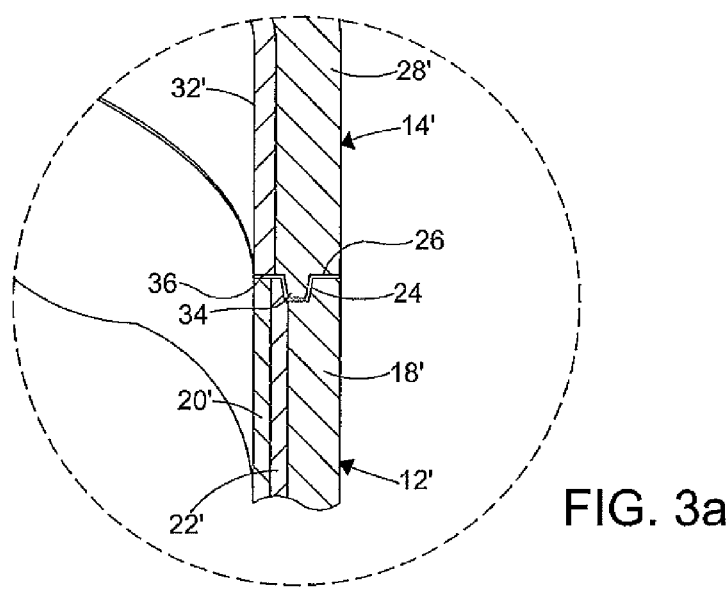
FIG. 3a is an enlarged fragmentary cross-sectional front elevational view of a portion of the pressure vessel illustrated in FIG. 3 and depicted by circle 3a therein.

FIGS. 3 and 3a illustrate a pressure vessel 10' according to another embodiment of the present invention similar to the pressure vessel 10 of FIGS. 1 and 1a, except as described below. Structure repeated from the description of FIGS. 1 and 1a includes the same reference numeral. Variations of structure shown in FIGS. 1 and 1a include the same reference numeral and a prime (') symbol.

As shown in FIGS. 3 and 3a the vessel liner 12' includes an outside layer 18', an inside layer 20', and a barrier layer 22' disposed between the outside layer 18' and the inside layer 20'. However, any number of layers may be used. As a non-limiting example, the vessel liner 12' may include a tie layer (not shown) between at least one of the outside layer 18' and the barrier layer 22' and the inside layer 20' and the barrier layer 22'. Typically, each of the outside layer 18' and the inside layer 20' are formed from a thermoplastic material. However, other plastics and non-metallic materials may be used. It is understood that the outside layer 18' and the inside layer 20' may be formed from the same or similar materials. It is further understood that the outside layer 18' and the inside layer 20' may be formed from different materials or similar materials having different physical properties. The barrier layer 22' is typically formed from a metal. However, other materials having suitable permeation characteristics may be used such as copolymers for example. As shown, the barrier layer 22' is spaced further from the outside surface 17 of the vessel liner 12' and closer to the pressure cavity defined by the vessel liner 12'. However, any positioning of the barrier layer 22' may be used. In certain embodiments, the inside layer 20' may be cancelled and the barrier layer 22' is formed as the innermost layer.

The end cap 14' is a multi-layer end cap typically formed using a back injection molding process. As shown more clearly shown in FIG. 3a, the end cap 14' includes an outside layer 28' and a barrier layer 32'. However, any number of layers may be used. As a non-limiting example, the end cap 14' may include a tie layer (not shown) between the outside layer 28' and the barrier layer 32'. Typically, the outside layer 28' of the end cap 14 is formed from a thermoplastic material. However, other plastics and non-metallic materials may be used. The barrier layer 32' of the end cap 14' is typically formed from a metal such as aluminum, for example. However, other materials having suitable permeation characteristics may be used such as copolymers, for example.

In use, the vessel liner 12' is formed is a similar method as described above. The end cap 14' is typical formed using a back injection molding process. As a non-limiting example, the barrier layer 32' of the end cap 14' formed by a metal foil may be pre-formed by a deep-drawing process. However, other injection process may be used to form the end cap 14'.

Once the vessel liner 12' and the end cap 14' are formed, at least one end cap 14' is coupled to at least one coupling edge 26 of the vessel liner 12'. It is understood that the axial position of the coupling area (e.g. welding seam) between the vessel liner 12' and the end cap 14' is dependent on the deep-draw ratio of the material structure by the barrier layer 32' of the end cap. As a non-limiting example, a shape of each of the vessel liner 12' and the end cap 14' is pre-determined to maximize the coupling surface area therebetween. Specifically, the coupling feature 24, 34 of each of the vessel liner 12' and the end cap 14' may be formed to maximize the coupling surface area therebetween. In the embodiment shown, the coupling feature 24 of the vessel liner 12' receives the coupling feature 34 of the end cap 14' in a "tongue and groove" fashion to maximize the coupling surface area. However, other shape and numbers of coupling features 24 and 34 could be used. As such, the vessel liner 12' may be coupled to the end cap 14' using a welding procedure. As a non-limiting example, the end cap 14' can be coupled to the vessel liner 12' using at least one of a hot-gas welding procedure and a hot-plate welding procedure known in the art. However, other coupling means may be used, such as an adhesive, for example. As such, the outer surface 17 of the vessel liner 12' is substantially smooth and continuous with an outer surface 48 of the end cap 14'. As such, the outer surfaces 17, 48 provide a suitable surface for composite winding while the barrier layers 22', 32' provides a suitable permeability for storing various pressurized fluids. It is further understood that the outside layer 28' of the end cap 14' could overlap the barrier layer 32' of the end cap 14' at the coupling area 26.

Thereafter, the boss 16' is coupled to the end cap 14'. As a non-limiting example, the boss 16 may be integrally formed with the end cap 14' during an end cap forming procedure and thereafter secured to the vessel liner 12' with the end cap 14'. As a further example, the boss 16' may be a divided boss formed from at least two components (not shown) and the end cap 14' may be disposed between the at least two components and secured therebetween to couple the end cap 14' with the boss 16. Other means for coupling the boss 16 to the end cap 14' may be used such as adhesives and structural coupling features.

Accordingly, the pressure vessel 10, 10', provides the inner vessel liner 12, 12' with a proper coupling surface between the vessel liner 12, 12' and the end cap 14 14', a suitable outer surface 17, 48 to ensure proper filament winding, and a suitable permeability for storing various pressurized fluids. It is also understood that various lengths of the vessel liners 12, 12' are possible using one extrusion machine.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A pressure vessel for storing a fluid, the pressure vessel comprising:
   a vessel liner forming a hollow tube and including a plurality of tubular layers with an aperture formed therein, the plurality of tubular layers including an inside layer, a barrier layer contacting the inside layer, and an outside layer contacting the barrier layer;
   an end cap coupled to the vessel liner, wherein the end cap has a plurality of layers, the plurality of layers including an inside layer aligned with the inside layer of the vessel liner at a coupling edge, a barrier layer contacting the inside layer of the end cap and aligned with the barrier layer of the vessel liner at the coupling edge, and an outside layer contacting the barrier layer of the end cap and aligned with the outside layer of the vessel liner at the coupling edge; and
   a boss having a neck portion, a shoulder portion, and a passage extending through both the neck portion and the shoulder portion, the neck portion including a coupling element, the shoulder portion integrally formed with the end cap, the outside layer of the end cap divided to substantially surround the shoulder portion and contact all of the boss except the neck portion;
   wherein the plurality of layers of the end cap extend about the shoulder portion and into the passage and end in the passage at a coupling element formed in the passage.

2. The pressure vessel according to claim 1, wherein at least one of the vessel liner and the end cap includes an annular channel and the other of the vessel liner and the end cap includes an annular rib.

3. The pressure vessel according to claim 2, wherein the barrier layer of one of the vessel liner and the end cap forms a portion of the annular rib.

4. The pressure vessel according to claim 2, wherein the outside layer of the end cap forms the annular rib.

5. The pressure vessel according to claim 2, wherein the annular channel and the annular rib each have inclined sides and a trapezoidal cross-section, and
   wherein the annular channel receives the annular rib for aligning and securing the end cap to the vessel liner in a tongue and groove fashion.

6. The pressure vessel according to claim 1, wherein the end cap is coupled to the vessel liner at the coupling edge using at least one of a hot-gas welding process, a hot-plate welding process, and an adhesive.

7. The pressure vessel according to claim 1, wherein the barrier layer of the vessel liner is formed from a metal and the barrier layer of the end cap is formed from an EVOH polymeric material.

8. A pressure vessel for storing a fluid, the pressure vessel comprising:
   a vessel liner forming a hollow tube and including a plurality of tubular layers with an aperture formed therein, the plurality of tubular layers including an inside layer, a barrier layer contacting the inside layer, and an outside layer contacting the barrier layer;
   an end cap coupled to the vessel liner, wherein the end cap has a plurality of layers, the plurality of layers including an inside layer aligned with the inside layer of the vessel liner at a coupling edge, a barrier layer contacting the inside layer of the end cap and aligned with the barrier layer of the vessel liner at the coupling edge, and an outside layer contacting the barrier layer of the end cap and aligned with the outside layer of the vessel liner at the coupling edge; and
   a boss having a neck portion, a shoulder portion, and a passage extending through both the neck portion and the shoulder portion, the neck portion including a coupling element, the shoulder portion integrally formed with the end cap, the outside layer of the end cap divided to substantially surround the shoulder portion and contact all of the boss except the neck portion;
   wherein the plurality of layers of the end cap extend about the shoulder portion and into the passage and end at a coupling element formed in the passage, and at least one of the vessel liner and the end cap includes an annular channel and the other of the vessel liner and the end cap includes an annular rib, and
   wherein the barrier layer of the end cap is overlapped by the outside layer of the end cap at the coupling edge.

9. The pressure vessel according to claim 8, wherein the annular channel and the annular rib each have inclined sides and a trapezoidal cross-section, and wherein the annular channel receives the annular rib for aligning and securing the end cap to the vessel liner in a tongue and groove fashion.

10. The pressure vessel according to claim 9, wherein the end cap is coupled to the vessel liner using at least one of a hot-gas welding process, a hot-plate welding process, and an adhesive, and wherein an outer surface of the end cap forms a substantially smooth and continuous surface with an outer surface of the vessel liner.

11. The pressure vessel according to claim 8, wherein each of the barrier layer of the vessel liner and the barrier layer of the end cap is formed from a metal having a pre-determined permeability.

12. The pressure vessel according to claim 8, wherein each of the barrier layer of the vessel liner and the barrier layer of the end cap is formed from a copolymer having a pre-determined permeability.

13. The pressure vessel according to claim 8, wherein the barrier layer of the end cap is formed from a metal foil.

* * * * *